(12) United States Patent
Hamrick

(10) Patent No.: US 7,621,505 B2
(45) Date of Patent: Nov. 24, 2009

(54) LINE RUNNER FOR CONDUIT

(76) Inventor: James C. Hamrick, 8 Charger Ct., Shelby, NC (US) 28152

( * ) Notice: Subject to any disclaimer, the term of this patent is extended or adjusted under 35 U.S.C. 154(b) by 299 days.

(21) Appl. No.: 11/712,169

(22) Filed: Feb. 28, 2007

(65) Prior Publication Data
US 2008/0203368 A1 Aug. 28, 2008

(51) Int. Cl.
*H02G 1/08* (2006.01)
(52) U.S. Cl. .............. 254/134.3 FT; 254/134.3
(58) Field of Classification Search ........ 254/134.3 FT, 254/134.4, 134.3 R
See application file for complete search history.

(56) References Cited

U.S. PATENT DOCUMENTS

| | | | |
|---|---|---|---|
| 382,257 A * | 5/1888 | Geyser | ............ 254/134.4 |
| 1,851,435 A | 3/1932 | Jessup | |
| 3,363,826 A | 1/1968 | Behler | |
| 4,077,610 A | 3/1978 | Masuda | |
| 4,202,531 A | 5/1980 | Hamrick | |
| 4,495,808 A | 1/1985 | Fischer, III | |
| 4,498,659 A * | 2/1985 | Brockelsby, III | ............ 254/134.4 |
| 4,596,381 A | 6/1986 | Hamrick | |
| 4,602,763 A | 7/1986 | Gaylin | |
| 4,715,747 A * | 12/1987 | Behrens | ............ 405/303 |
| 4,989,993 A | 2/1991 | Barnard | |
| 5,121,644 A | 6/1992 | Grey et al. | |
| 5,374,034 A | 12/1994 | Flores, Sr. et al. | |
| 5,442,136 A * | 8/1995 | Allen | ............ 174/95 |
| 5,906,357 A * | 5/1999 | Munson, Sr. | ............ 254/134.4 |
| 5,996,689 A | 12/1999 | Head | |
| 6,134,766 A | 10/2000 | Slevert | |
| 6,244,261 B1 | 6/2001 | West, Jr. | |
| 6,876,797 B2 * | 4/2005 | Morris | ............ 385/100 |
| 6,932,323 B2 * | 8/2005 | James | ............ 254/134.4 |
| 6,982,382 B2 | 12/2006 | Pena Valcarcel | |
| 7,360,752 B2 * | 4/2008 | Watkins | ............ 254/134 |
| 2008/0203368 A1 * | 8/2008 | Hamrick | ............ 254/134.4 |

* cited by examiner

*Primary Examiner*—Lee D Wilson
(74) *Attorney, Agent, or Firm*—McNair Law Firm, P.A.; William D. Lee, Jr.

(57) ABSTRACT

A carrier for pulling line through conduit, the carrier or line runner being an inflatable plastic sleeve that is closed at one end with gusset openings at the other end through which a line may pass and be tied to itself so that when the line runner is placed in a conduit with its closed end in the direction of travel, the application of lower pressure at the closed end will cause the sleeve to inflate and be propelled in the direction of the lower pressure pulling the line with it.

18 Claims, 2 Drawing Sheets

LINE RUNNER FOR CONDUIT

FIELD OF THE INVENTION

This invention relates to a flexible line runner for installing line in conduit, particularly in conduit having bends and differing diameters.

BACKGROUND OF THE INVENTION

Conduit is installed in a wide variety of construction projects ranging from residential and commercial buildings to transmission from central, electrical and communication distribution stations. After installation, the desired line must be run through the conduit. One common approach is to attach lightweight rope or cord onto a projectile which is inserted in one end of the conduit and driven through the conduit by air. The projectiles have taken several forms such as that of the drogue described in U.S. Pat. No. 6,932,323 to Benjamin James on Aug. 23, 2005 entitled "Drogue Having Based End Opening" where a flexible bag having an end opening allowing the bag to be inflated and pneumatically propelled along conduit, the bag bearing attached to and driving a biasing member which resiliently contacts the wall of the conduit. This device has the disadvantage of being relatively complex comprising two pieces which add to its cost and limits its flexibility within conduit.

Another prior device is described in U.S. Pat. No. 5,906,357 which issued on May 25, 1999 to Karl Munson, Sr. and is entitled "Conduit Torpedo Construction". The title says it all as the patent describes a torpedo-like carrier for line through a conduit. The diameter of the torpedo has to match rather closely the inner diameter of the conduit as the torpedo is rigid or semi-rigid and appears to be relatively costly to make. A similar device is described in U.S. Pat. No. 4,498,659 which issued on Feb. 12, 1985 to Pete Brockelsby, III and is entitled "Conical Line-Pulling Carrier". Again, a relatively rigid device is described which must match the inner diameter of the conduit and is relatively inflexible. The foregoing patents are exemplary of prior art devices which employ rigid or semi-rigid or inflexible line-pullers or torpedoes and are relatively costly. Accordingly, an object of my invention is to provide a line runner which is inexpensive, flexible, and easy to use.

In my earlier patent entitled "Apparatus and Method for Installing Line in Conduit" which is U.S. Pat. No. 4,596,381 that issued on Jun. 24, 1986, an inflatable bag is employed wherein the mouth of the bag may be shrunk around a holder for the line. The holder is a relatively rigid tube-like member which will keep the bag mouth open so that with the application of differential air pressure the bag will inflate and be propelled in the direction of the airflow. An object of my present invention is to eliminate the need for multiple piece construction for line carrier and, particularly, to eliminate the need for any rigid parts. Other advantages of my present invention will be better understood and appreciated by reference to the Summary of the Invention, Drawings, and Detailed Description which follow.

SUMMARY OF THE INVENTION

In one aspect, my invention is a process for making a line runner for conduit and installing line in conduit comprising the steps of cutting at least two gusset openings in one end of a closed sleeve of flexible, impervious or semi-pervious material; passing a securing line through two of said openings and fastening the line to itself leaving the trailing portion of the line to be pulled through a conduit, said line separating at least a portion of the edges of said openings to permit air to flow in and out of said sleeve; placing said sleeve in a conduit with the other end of the sleeve in the desired direction of motion and applying differential air pressure in the conduit whereby the sleeve will inflate and move in the direction of air flow pulling the line with it. Preferably the sleeve comprises a flexible plastic material which preferably is a linear low-density polyethylene. As one alternate embodiment, the sleeve comprises a fabric which may be woven or non-woven and either impervious or semi-pervious. Furthermore, the line may be fastened to itself by tying it in a knot and gathering the material between the two openings so that a gusset appearance is produced which holds the openings in the sleeve open allowing air to readily enter the sleeve.

It is understood that a sleeve is one description for the general type of receptacle that may be used in my invention. Bags, bag-like receptacles and pouches are within the scope of my invention. However, regardless of the type of receptacle, a significant feature of my invention is that only one component is needed, i.e., the properly cut or formed bag or sleeve whereas in most prior devices a number of components form the line carrier.

In another aspect, my invention is a line runner for moving line through conduit in response to pressure differential created in the conduit comprising an inflatable, flexible sleeve having an outer diameter when inflated that is greater than the inner diameter of the conduit, said sleeve having a closed front and rear; an opening in said sleeve said opening having an edge therearound defining the opening, said opening permitting air to enter into and inflate said sleeve; a flexible line attached to the rear of said sleeve whereby a pressure difference across said sleeve when placed in a conduit with the front end in the direction of the lower pressure will cause air to enter through said opening inflate said sleeve and move the sleeve in the direction of lower pressure pulling said line with it. The line runner preferably includes at least two openings in the rear of said sleeve and the line enters one of the openings and exits through the other, the segments of the line exterior to the sleeve being fastened closely together by gathering the material forming the rear of the sleeve so that at least a part of the edge of said openings are separated to allow air to enter the sleeve. The sleeve requires no additional parts nor does it require any parts that are rigid. Furthermore, the line segments may be fastened together by being tied in a knot or they may be clamped in some fashion. In some instances, larger diameter line may be used in this area but one of the purposes of my invention is to require as few parts as necessary.

In another aspect, the invention is a method of forming the sleeve or bag-like member by providing a tube or sleeve of impervious, heat sealable material in a lay flat condition then transversely heat sealing the walls of the sleeve together at spaced apart intervals and cutting the spaced apart members apart. One of the seals forms the leading edge or front of the sleeve or bag and the other the rear. Corner segments are removed to form the openings in the bags. These can be by scissor or knife cuts and may be straight line or curved or a combination of straight line and curved. In any event, a portion of the back seal is left so that line or cord may be threaded through the two openings and drawn back on itself to securely tie the line and at the same time gather the bag material and open it so that air may enter when the bag is placed in a conduit.

The line runner of my invention may be used in conduit of the same inflated diameter or in conduit of smaller diameter thus eliminating the need for multiple size runners and also accommodating changes in diameter of the conduit. By providing three different bag or sleeve diameters most of the commercially installed conduit can be accommodated. In the larger diameter bags or sleeves it is desirable to diagonally heat seal the corners of the leading or front side of the bag as it has been discovered that such corner sealing promotes the inflation of the larger bags.

These and other advantages of my invention will become apparent from the drawings and detailed description that follows.

DESCRIPTION OF THE DRAWINGS

The drawings which are attached hereto and made a part of this disclosure are for illustration and not for limitation. In the drawings.

DETAILED DESCRIPTION

Figure 1:
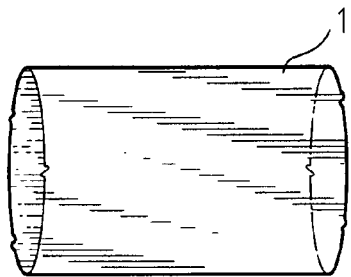
FIG. 1 shows a sleeve of flexible material from which a line-runner of the present invention may be formed.
Figure 2:
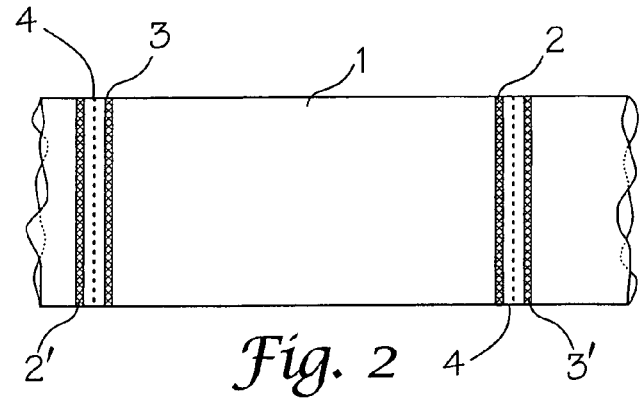
FIG. 2 shows the sleeve of FIG. 1 in a lay flat position with transverse heat seals to form a bag and with cut lines displayed.
Figure 3:
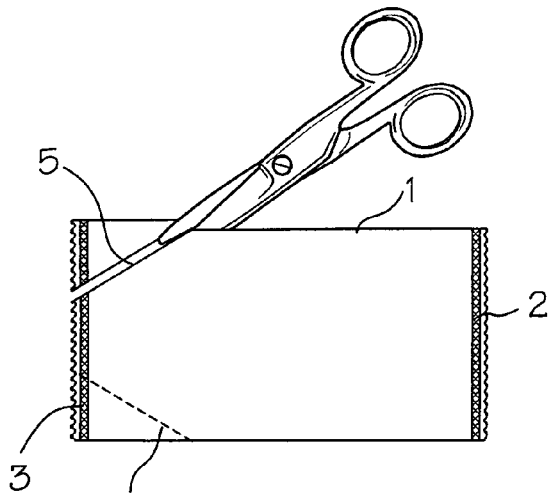
FIG. 3 shows the sleeve segment or bag segment of FIG. 2 which is being severed from the sleeve and shows segments of the bag which may be removed to provide openings into the interior of the bag.
Figure 4:
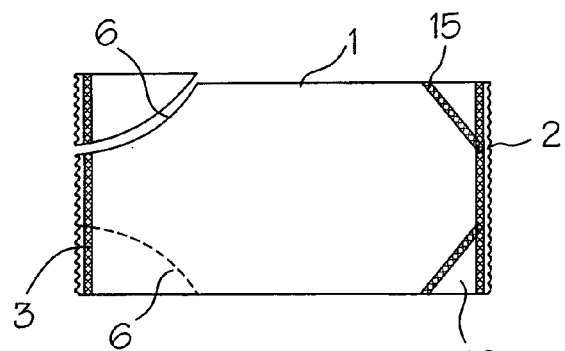
FIG. 4 shows an alternate configuration of the removal of bag material to provide openings.

Turning first to FIG. 1, tubular sleeve 1 is shown. Preferably this is a seamless tube of a thermoplastic material such as linear low-density polyethylene which is a very tough and strong form of polyethylene. Other heat sealable polymeric materials may also be used such as polypropylene, polyesters and nylon. While the seamless tube is preferred as the starting point for making the line runner of the present invention, superimposed sheets of heat sealable material may be longitudinally side sealed to form a tube also. Gussets may also be formed by inwardly creasing of both sides of the tube before sealing in the lay flat condition. FIG. 2 shows the tube or sleeve of FIG. 1 in lay flat condition where the sleeve 1 is heat-sealed at spaced apart intervals with transverse heat seals 2 and 3 which form the respective front and rear seals of the bag and along cut lines or score lines 4. The bags are preferably severed one from the other by a heat sealing process that in one seal and several motion forms the forward or leading seal to the front of sleeve 1 at the same time that the rear seal 3' is made on the preceding bag; and, at the same station or in the same motion, the two bags can be severed along this score line or cut line 4. Once the bag is sealed and severed, a second step is shown in FIG. 3 where bag material is removed along cut lines 5 which are straight diagonal lines cut by the scissors that are shown, for example, thus leaving a portion of the rear seal intact. This leaves openings for air to enter the bag. FIG. 4 shows an alternative cut at the rear of the bag seal 3 where the corners are removed by a quarter circle cuts 6 at each corner.

Figure 5:
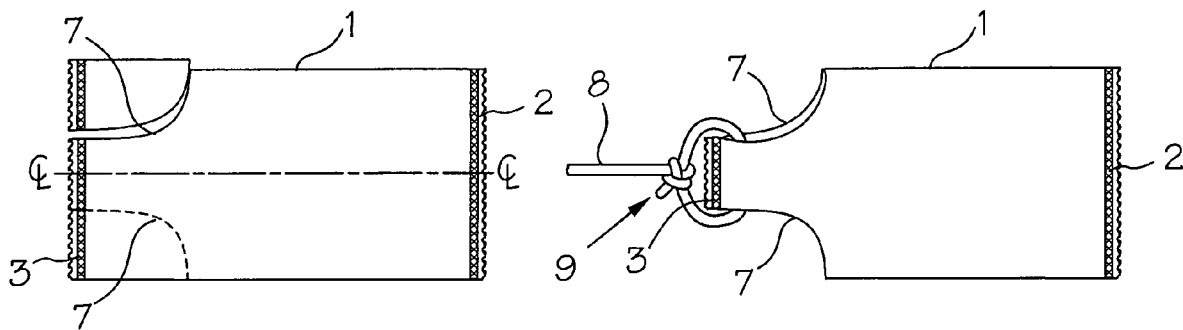
FIG. 5 shows yet another embodiment of a configuration for removing material to provide openings into the interior of the bag.
Figure 6:
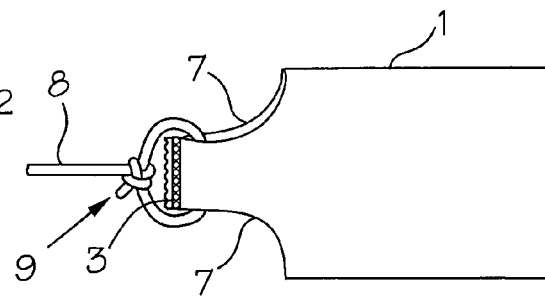
FIG. 6 shows the bag-like material or sleeve of FIG. 5 with material removed to form openings and includes the line passing between the openings.
Figure 7:
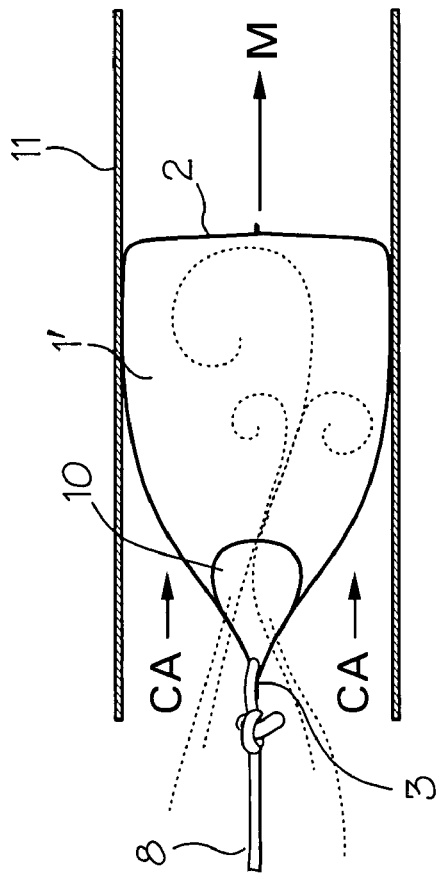
FIG. 7 is a schematic representation of the side view of FIG. 6.
Figure 8:
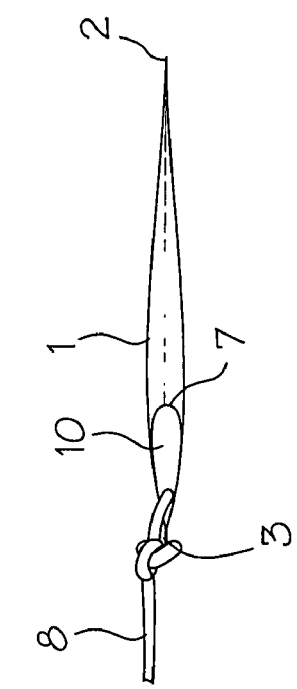
FIG. 8 shows the sleeve of FIG. 7 as it has been placed in a conduit and inflated by compressed air to move down the conduit.

Turning now to FIG. 5, a preferred and best mode of the invention is shown. Material in the rear or back corners of the bag-like member or sleeve 1 is removed along cut lines 7 which extend perpendicularly to the rear seal 3 and are equally spaced from the center line CL of the bag. Then, in a smooth arc the cuts move outwardly to the edge of the sleeve. When the cut out material is removed the bag-like member has an appearance as shown in FIG. 6. The cord or line 8 is looped through the openings formed by the removal of the material by the cut lines 7 and is tied into knot 9. FIG. 7 shows the side view of FIG. 6 in a schematic perspective. The line 8 is shown holding open the opening 10 so that the edges of the opening are separated to allow air to enter when the knot is tied tightly. The material between the two openings is gathered and tends to form the openings in a gusset-like fashion or in gathers. The bag or sleeve shown in FIG. 7, when placed in a conduit 11 as shown in FIG. 8 with compressed air CA applied, will inflate as air enters the opening 10 as illustrated by the dotted lines representing air flow. The continued application of compressed air will move the bag in the direction of arrow M which is the direction of lower pressure, a pressure differential being created along the bag from rear to front.

Figure 9:
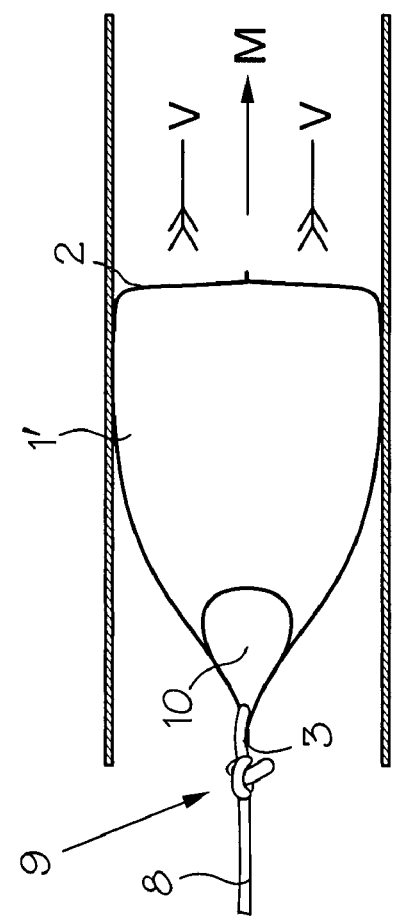
FIG. 9 shows the bag segment or line runner of FIG. 7 wherein the line runner has been placed in a conduit and is inflated and moved under the influence of vacuum.

In FIG. 9 when the sleeve is placed in conduit and air pressure it applied in the form of a vacuum indicated by the "V" arrows, the bag will again inflate as a pressure differential is created along the bag and air from the rear of the bag will enter causing the bag to move in the direction of arrow M. Using either compressed air or vacuum, the bag will move through the conduit pulling line 8 behind it. Particular advantages of the invention are that the bag, being flexible, will not hang up on rough spots or debris that may have been left in the line or where there are changes in the conduit diameter because of couplings and curvature. Also, being completely flexible, if the plastic bag should tear or break, it can readily be pulled out by the line as it will not get stuck or wedge into uneven areas in the conduit. If the line should break, the line runner can easily be blown out or sucked out whereas if a rigid line carrier were to get wedged or hung up it may be necessary to dig up an entire conduit installation.

Referring again to FIG. 6 which, as mentioned, is the preferred embodiment and best mode of the invention, line runners are made accordingly. Two sizes, the small and large, will accommodate the common range of conduit sizes but a medium size line runner is included below. These sizes are as follows:

Small Line Runner

For conduit with inner diameters of ½ to 2 inches the material of the bag is preferably linear low-density polyethylene having a thickness of 1.25 mil with the following dimensions:
Lay flat width=3 inches.
Length: 4 inches. Length of cuts: 7 (FIG. 6)=2 inches
Back seal width between cuts=1½ inches.

Medium Line Runner

For conduit having diameters from 1¼ inches to 4 inches, the bag is made of 1.5 mil linear low-density polyethylene with the bag lay flat width being 7 inches and the total length of the bag being 12 inches. The length of the cuts 7 (FIG. 6) is 3½ inches moved along the length of this bag and the width of each cut is 1 inch measured along seal 3 leaving the seal length of seal 3 at 5 inches. For this size bag and for the larger sizes it is preferable to provide corner seals in the front seam as shown in FIG. 4. Heat seal 15 diagonally seals the corners 16 so that the bag has "ears".

Large Line Runner

For conduit having diameters from 2 inches to 6 inches linear low-density polyethylene having a thickness of 1.5 mil is used with as lay flat width of the bag being 12 inches and the length being 18 inches. Material removed at cut 7 is a length of 5½ inches and a width of 1½ inches leaving the back seal 3 at 9 inches.

The linear low-density polyethylene provides the desired combination of toughness, strength, and flexibility. Other materials may be used such as low density polyethylene, polypropylene, polyester, or nylon. A tightly woven semi-pervious or impervious fabric, particularly a fabric of a synthetic material such as a polyester or nylon can be used but the cost of a fabric would be significantly greater and flexibility would not be as great.

As mentioned, for the common range of conduit diameters, two conduit line runner diameters can perform quite satisfactorily. Thus, the small line runner and large line sizes will meet the requirements from as ½" to 2" and from 2" to 6", respectively.

The line is preferably a strong light-weight line of nylon or synthetic material that can be paid out rapidly from a spool at the entrance end of the conduit. While a knot is the simplest way to affix the cord to itself other fastening means or methods may be used but may only add to the cost and complexity of my invention which has the advantage of providing a significantly improved line carrier or runner for conduit with a single component.

Figure 10:
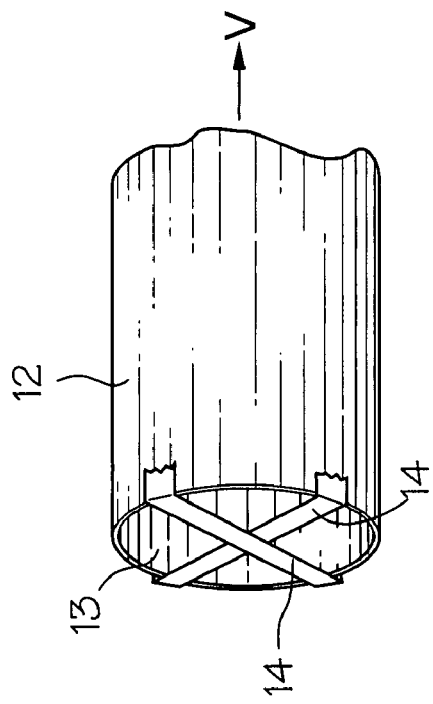
FIG. 10 shows strips of tape across the vacuum hose nozzle that provides vacuum within a conduit so that the line runner will not be drawn into the vacuum tank.

For many applications, a simple shop vac can be used to apply vacuum to a line. The nozzle can be fitted with "seal off" or rubber diameter reducing fitting that is funnel-shaped and fits around the hose nozzle to reduce or expand the effective diameter of the vacuum hose. These "seal off" fittings are readily available at electrical supply stores. A necessary caution here is to place strips of tape 14 over the nozzle 13 of a vacuum hose 12 as shown in FIG. 10 to prevent the line runner from being drawn into the vacuum tank.

Other embodiments and variations of my invention may occur to those skilled in the art upon reading the foregoing disclosure but my invention is only limited by the scope of the following claims:

What is claimed is:

1. A process for making a line runner for conduit and installing line therein comprising the steps of:
    a) providing a flattened sleeve of flexible impervious or semi-pervious material, said material being impervious to substantial air leaks, and heat sealing said material in spaced apart transverse seals to create a bag shaped closed sleeve;
    b) cutting at least two gusset openings in one end of said sleeve;
    c) passing a securing line through two of said openings and fastening the line to itself after passing through said at least two gusset openings leaving a trailing portion of the line to be pulled through conduit, said line separating at least a portion of the edges of said opening to permit air to flow in and out of said sleeve; said line runner having no rigid members and requiring none;
    d) placing said sleeve in a conduit with the uncut end of the sleeve in the desired direction of motion; and,
    e) applying differential air pressure in the conduit whereby the sleeve will inflate and move in the direction of air flow pulling line with the sleeve through the conduit.

2. The process of claim 1 wherein said sleeve comprises a flexible plastic material.

3. The process of claim 2 wherein the plastic material is linear low density polyethylene.

4. The process of claim 1 wherein the sleeve comprises an impervious fabric.

5. The process of claim 1 including the step of fastening the line to itself by tying the line in a knot and gathering the sleeve material between the gusset openings to increase the open area of the openings.

6. A line runner for moving line through conduit in response to a pressure differential created in the conduit comprising:
    a) an inflatable, flexible sleeve having an outer diameter when inflated that is greater than the inner diameter of the conduit, said sleeve having a closed front and rear;
    b) at least two openings in said sleeve, each of said openings having an edge therearound, with a line passing through said openings permitting air to enter into and inflate said sleeve;
    c) said flexible line being attached to the rear of said sleeve whereby a pressure difference along the length of said sleeve when placed in a conduit will cause air to enter through said opening, inflating said sleeve and move the sleeve in the direction of lower pressure pulling said line with the sleeve.

7. The line runner of claim 6 wherein said line enters one of the openings and exits through the other opening, the segments of the line exterior to the sleeve being fastened closely together thereby gathering the rear of the sleeve so that at least a portion of the edges of each of said openings are separated to allow air to enter the sleeve.

8. The line runner of claim 7 wherein the flexible line segments are fastened together by being tied in a knot.

9. The line runner of claim 6 wherein the sleeve is a segment of a flexible plastic tube.

10. The line runner of claim 9 wherein the flexible plastic tube is formed from linear low density polyethylene.

11. The line runner of claim 6 wherein the front and back of the sleeve are closed by transverse heat seals.

12. The line runner of claim 6 wherein the corners of the front of said sleeve have been diagonally heat sealed to form ears.

13. The line runner of claim 12 wherein the diameter of the sleeve is greater than 2 inches.

14. A line runner for pulling line through a conduit comprising a bag shaped member having an opening on each side of said bag member, said openings extending to one end of said bag; and, a line attached at said one end of said bag medially between said openings allowing said bag to be inflated and propelled by differential air pressure within a conduit thereby pulling said line through said conduit.

15. The line runner of claim 14, said runner having no rigid members and requiring none for its operation.

16. The line runner of claim 15 wherein said line runner can be used in conduit having a diameter less than that of said bag.

17. A line runner for conduit consisting of a flexible bag shaped member having two spaced apart openings in one end thereof and a line passing through said openings and being tied in a manner to gather the material of the bag shaped member between, said openings whereby said openings remain sufficiently open wherein air enters and inflates said bag.

18. A line runner consisting of a flexible sleeve of air impervious material, said sleeve being closed at one end and having openings at the other end through which line passes whereby the line is secured at the other end to said sleeve for pulling the line through a conduit when differential air pressure is introduced into the conduit with lower pressure at the closed end of the sleeve.

* * * * *